Nov. 24, 1959      C. W. ROTH      2,914,343

RETRACTABLE TRAILER HITCH

Filed Jan. 31, 1958      2 Sheets-Sheet 1

INVENTOR
CURTIS W. ROTH

BY Fisher, Christen & Goodson

ATTORNEYS

Nov. 24, 1959     C. W. ROTH     2,914,343
RETRACTABLE TRAILER HITCH

Filed Jan. 31, 1958                              2 Sheets-Sheet 2

INVENTOR
CURTIS W. ROTH

BY Fisher, Christen & Goodson

ATTORNEY

United States Patent Office 2,914,343
Patented Nov. 24, 1959

2,914,343
RETRACTABLE TRAILER HITCH
Curtis W. Roth, Eugene, Oreg.

Application January 31, 1958, Serial No. 712,406

8 Claims. (Cl. 280—491)

The present invention relates to an improved retractable trailer hitch.

The object of this invention is to provide a trailer hitch which may be quickly and easily retracted without use of tools to closed position behind rear bumper.

Other objects of the invention will be more readily apparent from the following description and the accompanying drawings.

Broadly stated the construction of this invention includes a pair of overlapping trailer hitch members. They are joined at one end of the overlapping portion by a sliding pivotal connection and also joined at the other end of the overlapped portion by means for selectively restraining and permitting pivotal movement of the slidable pivotal connection. Abutment means provided on the two members are adapted to be engaged to prevent sliding when the members are held parallel by the means for restraining pivotal movement.

This novel structure permits the ball connector of a trailer hitch to be hidden between the rear bumper and the back of the body of an automobile in a retracted position. The sliding pivotal connection permits the ball connector to be depressed to clear the bumper for easy extension to an operative position to the rear of the bumper. This combination with the abutment means and the lock means permits longitudinal movement of the ball connector from the retracted to the extended position without the use of tools. The use of an outer member of U-shaped cross-section and an inner bar as the main trailer hitch members facilitates the provision of the novel features of construction.

The preferred form of the sliding pivotal connection includes a pair of slots in the wings or sides of the U-shaped member and a cooperating pair of studs on the bar.

The restraining means for the other end of the overlapped members is a lock pin passing through holes in the sides or wings of the U-shaped member and under the bar.

The preferred form of the abutment means includes a pin on the base of the U-shaped member adapted to fit into either a hole or holes or else fit at the end of the bar. The stud and slot arrangement previously described may also assist in restraining longitudinal motion in one direction, particularly where the abutment pin is at the end of the bar.

A suitable ball, socket or other connection element is fixed on the outer end of the bar, and in the preferred form of the invention a suitable hole or holes are provided in the base of the U-shaped member to provide passage therefor to permit positioning of the bar in a retracted position.

The preferred form of the invention is illustrated in the accompanying drawings in which.

Figure 2:
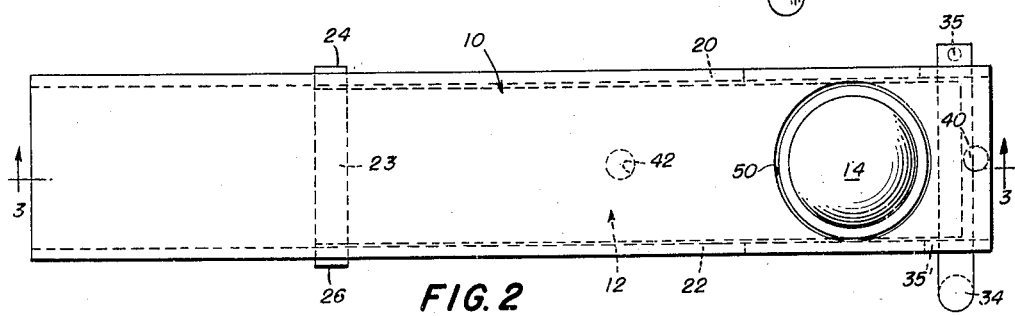
Fig. 2 is a plan view of the hitch in the position illustrated in Fig. 1.
Figure 3:
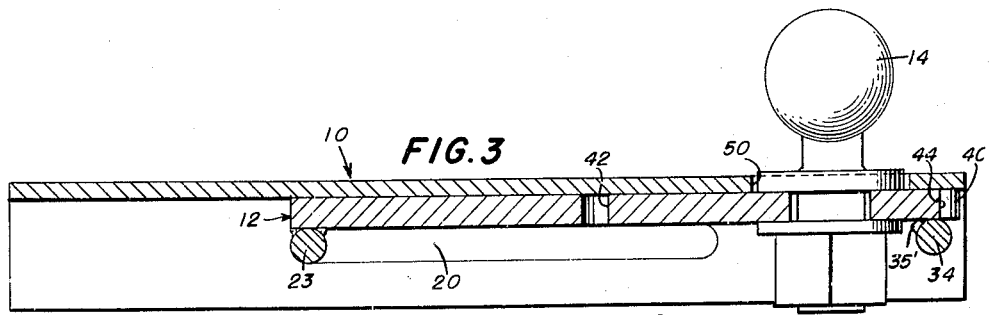
Fig. 3 is a view partly in section and partly in elevation, taken along line 3—3 of Fig. 2.
Figure 4:
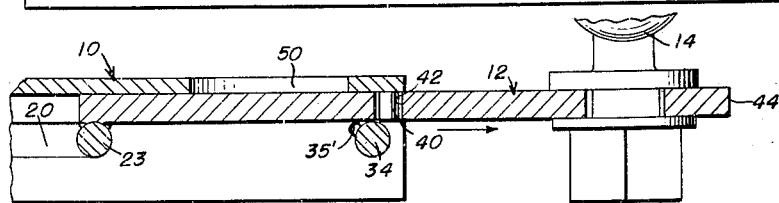
Fig. 4 is a view partly in section and partly in elevation with a part of ball 14 broken away, showing the hitch of Figs. 1–3 in the extended position.
Figure 5:
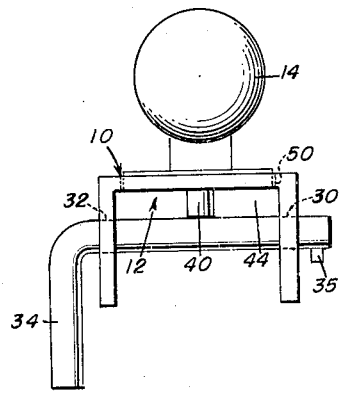
Fig. 5 is an end elevation illustrating the trailer hitch of Fig. 1 in the retracted position.

In that preferred form of the invention illustrated in the drawings, a retractable trailer hitch is formed with a U-shaped outer member indicated generally at 10 and a second overlapping member in the form of a bar indicated generally at 12 (Figs. 2, 3 and 4). The free outer end of member 10 is normally attached to a motor vehicle as 100 in Fig. 6 and the free outer end of bar 12 is provided with a suitably attached ball 14 adapted to be fitted into a socket on a trailer to complete a trailer hitch.

The two members 10 and 12 are adapted to be telescoped by the mechanism to be described. This mechanism includes pivotal sliding connection formed by a pair of slots 20 and 22 in the wings or sides of the U-shaped member 10 and a pin 23 forming a pair of studs 24 and 26 at the inner overlapped end of bar 12 with each stud in a slot. The mechanism also includes a pair of holes 30 and 32 in the wings or sides and adjacent the outer end of U-shaped member 10 along with a removable lock pin 34 which is of the twist lock type pin. The pin 34 is adapted to pass below bar 12. The lock pin 34 holds members 10 and 12 parallel thereby preventing pivoting motion about studs 24 and 36 and at the same time holding abutment means (to be described) in operative relationship to prevent sliding motion of the studs in slots 20 and 22.

The abutment means illustrated in the drawings include a pin 40 mounted on the base of the U-shaped member at its overlapped end for engaging either a hole 42 in bar 12 or the end 44 of the bar. Obviously more than one hole like hole 42 may be provided and a plurality of pins and holes may be used for additional strength if it appears desirable.

Figure 1:
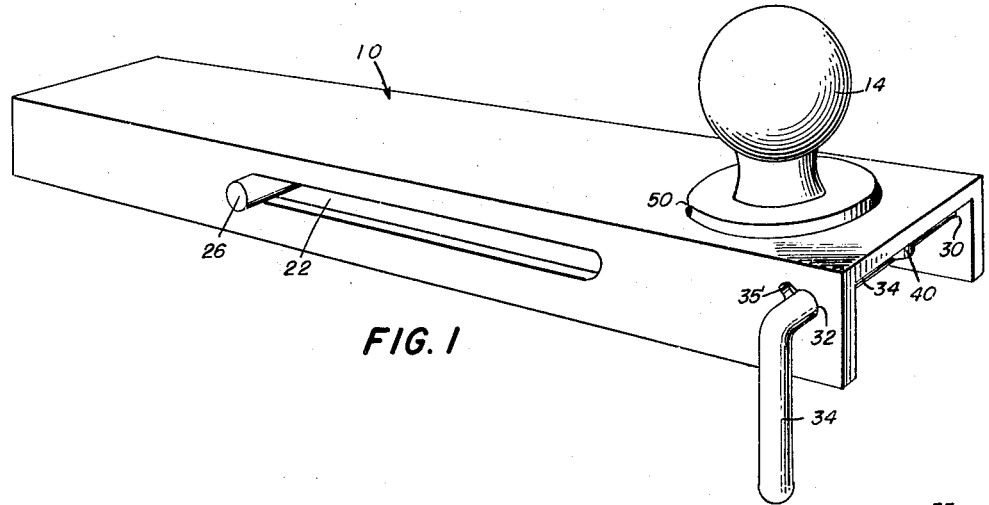
Fig. 1 is a perspective view appearance of the trailer hitch of the present invention in the retracted position.

In the form illustrated wherein the ball 14 extends upwardly, a hole 50 is provided in the base of member 10 to accommodate the ball in the retracted position of Figs. 1–3.

In operation the end of member 10, to the left in the drawings, is adapted to be and normally will be attached to a motor vehicle 100. Ball 14 is adapted to be attached to a socket connection of a trailer.

Figure 6:
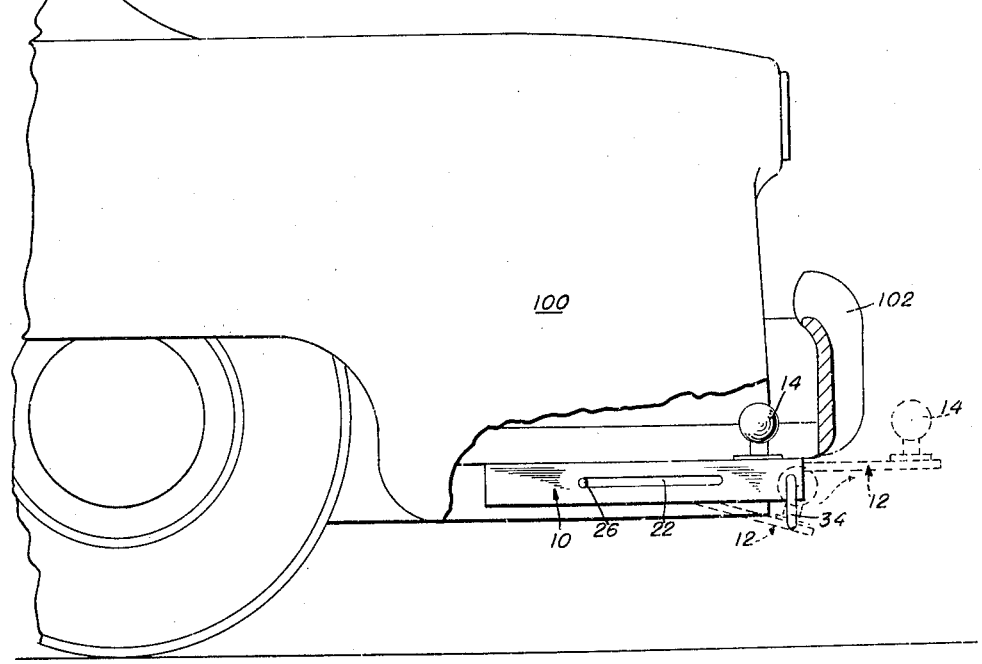
Fig. 6 is a sketch diagrammatically illustrating the trailer hitch.

To shift from one position to another merely required the removal of pin 34 from holes 30 and 32, after which the outer end of bar 12 is pivoted downwardly about the pivot point formed by studs 24 and 26 until ball 14 is clear of the elements of U-shaped member 10. The entire bar 12 and the elements carried thereby may then be slid forwardly or rearwardly along a path predetermined by the studs 24 and 26 riding in slots 20 and 22. If moved forwardly to the retracted position, the outer end of bar 12 is pivoted upwardly to bring pin 40 just ahead of the front of bar 12 at 44 and ball 14 passes through hole 50 to a position forward of the rear bumper 102 of the towing vehicle 100 as illustrated in Figure 6. Then pin 34 is fixed in position to complete the assembly. On the other hand if the bar 12 is moved rearwardly, the upward pivotal motion will place pin 40 in hole 42 and ball 14 will be extended beyond the outer end of member 10 and to the operative position to the rear of the bumper 102 as illustrated in Figures 4 and 6. Again, reinsertion of pin 34 completes the simple assembly.

It will be obvious to those skilled in the art that the features of the invention can be embodied in other less preferable specific forms not illustrated. For example, two elongate bars each having rectangular cross-section may be used if the other parts of the structure are suitably modified. In such constructions the sliding pivotal connection may take the form of a collar slideable on the bar attached to the towing vehicle wherein the collar is provided with a depending ear or ears for pivotally mounting the overlapped end of the bar carrying the ball or other hitch connector element. In such modifications the abutment means may take the form of a C-shaped connecting collar adapted to fit around the bars in selected pairs of matching notches at each side thereof. Suitable locking means could be associated with the collar. This could be a lock pin extending through depending ears on the collar. Of course, such an abutment collar could be formed in two C-shaped halves hinged together and spring loaded to an operative position to form a removable member having elements serving as abutment means and elements serving as lock means.

Obviously, certain other modifications of the preferred form of the invention can be made by those skilled in the art without departing from the scope of the invention.

I claim:

1. A retractable trailer hitch for attachment to a rear bumper comprising a pair of overlapping elongated members parallel in their operative positions and joined at one end of the overlapping portion by a sliding pivotal connection and joined at the other end of the overlapping portion, means at said other end for selectively restraining and permitting pivotal movement about said pivotal connection in a plane transverse to said bumper, and abutment means for preventing sliding movement at said connection when and only when said members are parallel, one of said members being fixed and the other being movable about said pivotal connection, said movable member carrying on said other end the ball joint of a trailer hitch and said movable member being pivotable through a relatively wide angle whereby said ball joint may be hidden behind said bumper in one position and moved outwardly above the bottom level of said bumper in a second position.

2. A hitch as defined in claim 1 wherein one of said members is a U-shaped outer member having a slot in each wing of the U and the other of said members is an inner member having a stud at each side thereof and said studs and slots provide said sliding pivotal connection.

3. A hitch as defined in claim 2 wherein said abutment means include a pin on the base of the U of the U-shaped member extending in the same direction as the wing of the U and at least one hole in said other member to receive said pin.

4. A trailer hitch comprising an elongated member of U-shaped cross section having one end adapted to be fixed on a vehicle, a second elongated member longitudinally slideable in said first member, a pair of longitudinally extending slots, one in each wing of the U of said first member, a connector element fixed on the outer end of said second member, a pair of studs fixed on the opposite end of said second member with each stud slideably engaged in a respective one of said slots for guiding sliding movement of said members while providing pivotal movement of said second member with respect to said first member, cooperating abutment means on each of said members including at least two such means on one of said members for selectively holding said members against relative longitudinal movement in two separate positions, one extended and one retracted, and manually operable lock and retaining means for holding selected ones of said abutment means in operative relationship by retaining the outer end of said second member within the U of said first member in one position of said lock means and releasing said outer end for movement to opposite position upon manual movement of said lock means.

5. A retractable trailer hitch comprising a first elongated member attached to a towing vehicle having a rear bumper, a second elongated member having a hitch connector attached to one end thereof with the other end thereof overlapping said first member, a sliding pivotal connection between the overlapped end of said second member and said first member whereby sliding pivotal movement of said connection places said hitch connector forward of said bumper in one position and rearward of said bumper in a second position, abutment means for restraining longitudinal movement of said elongated members when they are parallel and when said hitch connector is in either of said positions, and removable lock means for holding said elongated members parallel and holding said abutment means in operative abutting positions when said lock means is in its operative position whereby removal of said lock pin will permit actuation of said pivotal sliding connection.

6. A retractable trailer hitch comprising a pair of overlapping elongate members parallel in their operative positions and joined at one end of the overlapping portion by a sliding pivotal connection and joined at the other end of the overlapping portion, one of said members being a U-shaped outer member having a slot in each wing of the U and the other of said members being an inner member having a stud at each side thereof, said studs and slots providing said sliding pivotal connection, means at said other end for selectively restraining and permitting pivotal movement about said pivotal connection, said means including a hole in each wing of said U and a manually removable pin, and abutment means for preventing sliding movement at said connection when and only when said members are parallel.

7. A retractable trailer hitch comprising a pair of overlapping elongate members parallel in their operative positions and joined at one end of the overlapping portion by a sliding pivotal connection and joined at the other end of the overlapping portion, one of said members being a U-shaped outer member having a slot in each wing of the U and the other of said members being an inner member having a stud at each side thereof and said studs and slots providing said sliding pivotal connection, means at said other end for selectively restraining and permitting pivotal movement about said pivotal connection, and abutment means for preventing sliding movement at said connection when and only when said members are parallel, said other member being provided with a connection member at its free end and at least one hole being provided in said U-shaped member to permit said connection to pass therethrough.

8. In combination with an automobile having a rear bumper, a retractable trailer hitch comprising an upper fixed elongate member attached to the rear of the underside of the automobile with its upper and rear portion positioned just beneath and forward of the bumper, a lower overlapping elongate member parallel to the fixed member in operative position, a sliding pivotal connection between said members adjacent the forward ends thereof, a ball connector positioned on the rear unpivoted end of said lower overlapping member, said overlapping member being swingable downwardly in a plane normal to said bumper about said pivotal connection to an extent permitting said ball connector to clear said bumper and slidable at said connection to an extent permitting said ball connector to be selectively positioned at opposite sides of said bumper, and means for retaining said overlapping member in overlapping parallel relation to said fixed member with said ball connector at either side of said bumper.

References Cited in the file of this patent

UNITED STATES PATENTS

| 2,544,185 | Sargent | Mar. 6, 1951 |
| 2,612,384 | Wiegman | Sept. 30, 1952 |
| 2,624,589 | Strand | Jan. 6, 1953 |
| 2,685,457 | Van Zee | Aug. 3, 1954 |

FOREIGN PATENTS

| 375,840 | Germany | May 18, 1923 |